United States Patent Office 3,185,724
Patented May 25, 1965

3,185,724
PROCESS FOR MANUFACTURE OF ORGANO-BORON HALIDES AND ESTERS
Nathaniel L. Remes, Elgin, and Thomas W. Martinek, Round Lake, Ill., assignors to The Pure Oil Company, Chicago, Ill., a corporation of Ohio
No Drawing. Filed July 10, 1957, Ser. No. 670,867
10 Claims. (Cl. 260—462)

This invention relates to new and useful processes for preparing organo-boron compounds and more particularly to a method of preparing aryl-substituted hydroxyboranes.

In recent years organo-boron compounds have become important as intermediates in the preparation of high energy fuels and as fuel additives for preventing octane requirement increase in gasoline-operated internal combustion engines. In particular, the alkyl- and aryl-substituted hydroxyboranes $RB(OH)_2$ and $R_2BOH$, and the alkyl- and aryl-substituted alkoxy- and aroxy-substituted boranes, $RB(OR)_2$ and $R_2BOR$, are useful as intermediates in the preparation of alkyl- and aryl-substituted boranes and as gasoline additives (U.S. Patents 2,710,251 and 2,710,252) for preventing octane requirement increase in spark-ignited internal combustion engines.

The nomenclature used througout this application is generally the systematic nomenclature of Wartik and Schaeffer, which is accepted by the A.C.S. Committee on Inorganic Nomenclature as a standard systematic nomenclature for boron compounds.

Previous methods for the preparation of organo-boron compounds have made use of organo-lithium compounds (Brindley et al., J. Chem. Soc. 2956 (1955)) or Grignard reagents (Letsinger and Skoog, J. Am. Chem. Soc. 76, 4174 (1954)) as intermediates. The Grignard reagents are generally prepared from alkyl or aryl bromides and magnesium. The lithium compounds are prepared from alkyl bromides, or, in the case of aryl derivatives, by the interaction of an aryl bromide or aromatic hydrocarbon with an alkyl lithium compound. The alkyl and aryl bromides and other bromide intermediates are expensive and difficult to prepare. The use of organo-lithium compounds is subject to the further disadvantage that lithium has physical properties, (e.g., hardness and very low density) which make it intractable. Organo-lithium compounds are subject to the further disadvantage that their reactions are variable and difficult to predict under any given set of operating conditions. For example, it has been found that organo-lithium compounds, such as alkyl or aryl lithium, generally undergo more severe reactions than other metal alkyls. Thus alkyl lithium compounds when reacted with trialkyl borates will produce dialkyl derivatives or trialkyl derivatives while the corresponding Grignard reagent produces a monoalkyl derivative. Lithium and other alkali metal alkyls or aryls are subject to the further disadvantage that their preparation, by reaction with alkyl or aryl halides, results in the loss of half of the metal as the halide.

It is therefore one object of this invention to provide a new and improved method of preparing organo-boron compounds.

Another object of this invention is the provision of an improved process for preparing organo-boron compounds from boron halides or borate esters which does not require the use of expensive and difficult-to-handle Grignard reagents, organo-lithium compounds, or metal alkyls.

A feature of this invention is the provision of a new method of preparing organo-boron compounds by the reaction of a sodium metal complex of an aromatic hydrocarbon with a boron halide or a borate ester.

Another feature of this invention is the provision of a new and improved method of preparing aryl-substituted mono- or di-hydroxy boranes by the reaction of a sodium metal complex of a fused-ring polycyclic aromatic hydrocarbon with a boron halide or a borate ester.

Other objects and features of this invention will become apparent from time to time throughout the specification and claims as hereinafter related.

Our invention is based on the discovery that organo-boron compounds can be prepared by the reaction of a sodium metal complex of a polycyclic aromatic hydrocarbon, which may be a fused ring aromatic hydrocarbon, or an aromatic hydrocarbon containing at least two benzene rings connected by a carbon-carbon double bond, with a boron halide or a borate ester. The sodium-hydrocarbon complex which is used in this process is one in which sodium metal is combined in molecular form with an aromatic hydrocarbon without replacing a hydrogen of the hydrocarbon. Aromatic hydrocarbons which may be complexed with sodium and used in carrying out this process include fused ring polycyclic aromatic hydrocarbons, such as naphthalene, anthracene, phenanthrene, and mixtures of aromatics commonly produced in petroleum refining by re-forming, solvent extraction, etc. Benzene is not a suitable starting material since it does not form a complex with sodium. Other suitable hydrocarbons which form a complex with sodium include polycyclic aromatic hydrocarbons in which at least two benzene rings are interconnected by a carbon-carbon double bond, including 1,2-diphenyl ethylene; 1,1,2-triphenyl ethylene; 1,1,2,2-tetraphenyl ethylene; 1,4-diphenyl butadiene, etc. These sodium-hydrocarbon complexes can be reacted with boron halides, including boron trichloride, boron trifluoride, boron tribromide, or boron tri-iodide, or lower trialkyl borate esters, including tributyl borate, tripropyl borate, trihexyl borate, and triethyl borate to form organo-boron compounds as above described.

To carry out our process, a sodium metal complex of a polycyclic aromatic hydrocarbon is placed in a suitable reaction flask and the boron reactant added thereto. The reaction is preferably carried out in the liquid phase, using an inert solvent or diluent, and a boron compound to sodium-hydrocarbon complex ratio in the range from 1:3 to 3:1. The reaction is very exothermic and so the boron compound (boron halide or borate ester) is added at relatively low temperatures, viz., 0°–25° C., maintaining external cooling where necessary. The reaction is usually instantaneous, but to insure completeness of reaction the mixture is heated to a temperature of about 50°–175° C, for 1 to 3 hours after the addition of the boron compound has been completed. Any excess sodium reagent remaining after completion of the reaction is inactivated by hydrolysis. The aryl-substituted hydroxyboranes that are produced in this process may be recovered as their sodium salts, after hydrolysis, by extracting excess hydrocarbon with an inert solvent. These compounds may also be recovered from the alkaline solution by acidification and subsequent extraction with a suitable solvent, such as diethyl ether. Other purification techniques, based on the physical and chemical properties of the aryl-substituted hydroxyboranes and their salts, may also be employed. For example, the aryl-substituted dihydroxy boranes may be esterified by reaction with an alcohol under the proper reaction conditions, and the esters isolated by distillation. The sodium salts may be soluble in water or aqueous alkali, in which case they may be recovered by simple extraction. The solvent and regenerated hydrocarbons may be recovered and recycled by conventional methods.

The following specific example illustrates a typical preparation of an aryl-substituted hydroxyborane by the method of our invention. Sodium-naphthalene complex was prepared by placing 256 grams of naphthalene, 46 grams of sodium, and 800 cc. of tetrahydrofuran in a three-necked flask equipped with stirrer, reflux condenser, and dropping funnel, and permitting the reaction to proceed. A nitrogen atmosphere was maintained in the flask. Boron trifluoride etherate ($BF_3 \cdot C_2H_5OC_2H_5$), was then added in an amount of 95 grams over a period of 1.25 hours, with continuous stirring. After the addition was complete, the mixture was heated at reflux temperature (59° C.) for 3 hours. The resulting reaction mixture was then hydrolyzed with dilute hydrochloric acid and the organic components were separated from the inorganic components by extraction with ether. Naphthyl-substituted hydroxyboranes were separated from the recovered hydrocarbon phase by extraction with aqueous alkali. Acidification of the aqueous alkaline extracts yielded 41.0 grams of naphthyl-substituted hydroxyboranes.

A portion of the naphthyl-substituted hydroxyboranes was esterified by azeotropic distillation with butyl alcohol and toluene until no more water was formed. Atmospheric and subsequent vacuum distillation yielded the butyl derivatives of these boranes. The product produced by this method was analyzed for boron content (4.02%) and molecular weight (244) which indicated that the mixture prior to esterification with butyl alcohol consisted of approximately 30% naphthyldihydroxyborane and approximately 70% dinaphthylhydroxyborane.

Other polycyclic fused-ring aromatic hydrocarbons, including anthracene, phenanthrene, and mixtures of aromatics commonly produced in petroleum refining by reforming, solvent extraction, etc., and aromatic hydrocarbons in which at least two benzene rings are connected by a carbon-carbon double bond have been found to form molecular complexes with sodium metal. These complexes when reacted with boron halides, including boron trifluoride, boron tribromide, and boron triiodide, or lower trialkyl borate esters, including tripropyl borate, tributyl borate, triamyl borate, and trihexyl borate, produce reaction products which may be hydrolyzed to form aryl-substituted mono- and di-hydroxy boranes.

Having thus described our invention fully and completely as required by the patent statutes, we wish to point out that within the scope of the appended claims this invention may be practiced otherwise than as specifically described.

What is claimed is:

1. A method of preparing aryl-substituted boron intermediates which yield aryl-substituted hydroxy boranes upon hydrolysis, which comprises reacting a sodium metal complex of a compound selected from the group consisting of polycyclic fused-ring aromatic hydrocarbons and aromatic hydrocarbons containing at least 2 benzene rings connected by a carbon-carbon double bond in solution in an inert solvent with a compound selected from the group consisting of boron halides and lower trialkyl borate esters.

2. A method in accordance with claim 1 in which the mol ratio of sodium metal complex to boron reagent is in the range of 1:3 to 3:1 and the reaction temperature is in the range of 0°–100° C.

3. A method in accordance with claim 2 in which a sodium-containing reactant is a sodium metal complex of a fused-ring aromatic hydrocarbon.

4. A method in accordance with claim 3 in which the boron-containing reagent is a boron halide.

5. A method in accordance with claim 3 in which the boron-containing reagent is a lower trialkyl borate.

6. A method in accordance with claim 3 in which the reaction mixture is cooled to 0°–25° C. during addition of the boron-containing reagent.

7. A method in accordance with claim 1 in which the inert solvent is tetrahydrofuran.

8. A method in accordance with claim 2 in which the inert solvent is tetrahydrofuran.

9. A method in accordance with claim 2 in which sodium naphthalene is reacted with boron trifluoride etherate in solution in tetrahydrofuran.

10. A method of preparing aryl-substituted boron compounds containing at least one boron to carbon bond which comprises reacting a sodium metal complex of naphthalene in solution in an inert solvent with a compound selected from the group consisting of boron trihalides and lower trialkyl borate esters.

References Cited by the Examiner

UNITED STATES PATENTS 2,898,365  8/59  Washburn et al. _____ 260—500 X

OTHER REFERENCES

Brindley et al.: J. Chem. Soc., 2956–8 (1955).
Jones et al.: Chem. Reviews, 54, 835–890 (1945), p. 875.
Mikhailovic et al.: Chem. Abs., 49, 13142 (1955).

CHARLES B. PARKER, *Primary Examiner.*

N. MARMELSTEIN, LEON ZITVER, ROGER L. CAMPBELL, *Examiners.*